United States Patent [19]
Reiter

[11] 3,908,273
[45] Sept. 30, 1975

[54] DENTAL RETAINER
[76] Inventor: David Reiter, 5104 Skillman Ave., Woodside, Long Island, N.Y. 11377
[22] Filed: May 28, 1974
[21] Appl. No.: 473,422

[52] U.S. Cl. ..................................................... 32/63
[51] Int. Cl.² .......................................... A61C 5/12
[58] Field of Search ........................................ 32/63

[56] References Cited
UNITED STATES PATENTS
2,709,302    7/1955    Reiter .................................... 32/63

*Primary Examiner*—Robert Peshock

[57] ABSTRACT

A dental retainer having a head with an elongated slot is provided. The head is adapted to receive the ends of a matrix band in the elongated slot and is moveably mounted to the retainer. The head is closed at two opposed sides to retain the matrix band therein and is moveable on the retainer to permit one of the closed sides to lie against the occlusal where the lower portion of the bracket is pointed at the gingiva in order to permit the matrix band to form itself into a conical shape about the tooth in conformance with the conical configuration of the tooth. In another embodiment a spring is used to normally urge the head into a selected neutral position and to permit the head to move so that one end thereof is adjacent the occlusal or upper portion of the tooth while the bottom thereof is adjacent the gingiva or lower portion of the tooth.

1 Claim, 7 Drawing Figures

DENTAL RETAINER

This invention relates to dental matrix retainers and, more particularly, to a dental matrix retainer which can form a flat matrix band into a conical configuration about a tooth.

A dental matrix band is a band which is placed about a tooth to be worked on by a dentist. The matrix band provides a surface for a filling and is generally deemed essential when major restoration of a tooth is to be undertaken. Dental matrix bands are generally made of thin steel or other metal which can be bent and placed around a tooth and between adjacent teeth. Prior art retainers have generally been used to grip the free ends of the matrix band and to tighten the band about the tooth. One shortcoming of many of the prior art retainers is that they do not conform the matrix band to the shape of the tooth, thereby making work on the tooth difficult.

Human teeth are generally conical in shape with the occlusal or upper portion being larger than the gingiva or lower portion of the tooth. In order to properly support the work to be done on the tooth, the matrix band should conform to the shape of the tooth. At least one available device has achieved some measure of support along the conical height of a tooth by use of a conically pre-shaped matrix band. However, since the shape of teeth varies from tooth to tooth and individual to individual, the conical preshaping of a matrix band does not assure one of achieving a tight conformation of the selected matrix band to the tooth.

In accordance with the instant invention, a simple, flat, thin metal matrix band which has not been previously shaped can be used in connection with the retainer of the invention. The retainer is so constructed that its proper use automatically shapes the flat dental matrix band to the desired conical shape about the tooth to be worked on.

The dental retainer of the instant invention is provided with a head on one end thereof. The head has an elongated opening therein for receiving the matrix band, which opening is closed at both ends. One wall of the head is provided with a slot for mounting the head to the body of the retainer. The slot permits the head to pivot and move from side and side and allows the head to be positioned with respect to the tooth being worked on somewhat independently of the remainder of the retainer.

The matrix band is of somewhat lesser extent than the elongated opening in the bracket to permit the matrix to cant with respect to the head. In accordance with the method of the invention, one end of the head is positioned adjacent the occlusal and the lower portion of the bracket points to the gingiva of the tooth. When the matrix band is slipped around the tooth and the retainer tightened to take up any slack remaining in the matrix band, the canted orientation of the matrix band with respect to the head, along with the pivoting of the head to accommodate the cant of the matrix band, will assure that the portion of the matrix band surrounding the gingiva will be pulled in more than the portion of the matrix band surrounding the occlusal. This achieves a good fit of the matrix band about the entire tooth regardless of the particular shape of the tooth.

To best facilitate forming the matrix band conically about a tooth, the head is provided with a V-shaped extension. The matrix band will fold to form into a conical shape on one or the other side of the V as will become more readily apparent from the detailed description. The use of a V-shaped extension permits the retainer to be used with equal facility in all parts of the mouth, in contrast to other retainers which are generally easy to handle only in certain selected parts of the mouth.

In an alternate embodiment of the invention, a wedge is mounted on the retainer. The wedge extends below the lowest portion of the head and when the retainer is in use the wedge is pointed at the gingiva in the area between two adjacent teeth. The wedge can be used to retain either cotton or a rubber dam in place in the patient's mouth. The wedge can further be used for moving adjacent teeth apart to permit easy insertion of the matrix band over the tooth to be worked on.

In a still further embodiment the head is urged into a selected normal orientation with respect to the remainder of the retainer. This makes it simple for the dentist to insert the matrix band into the head while at the same time providing a force to keep the head in a position against the occlusal during tightening of the retainer.

Referring now to the drawings in which various preferred embodiments of the invention are shown and where like numerals refer to like parts:

Figure 1:
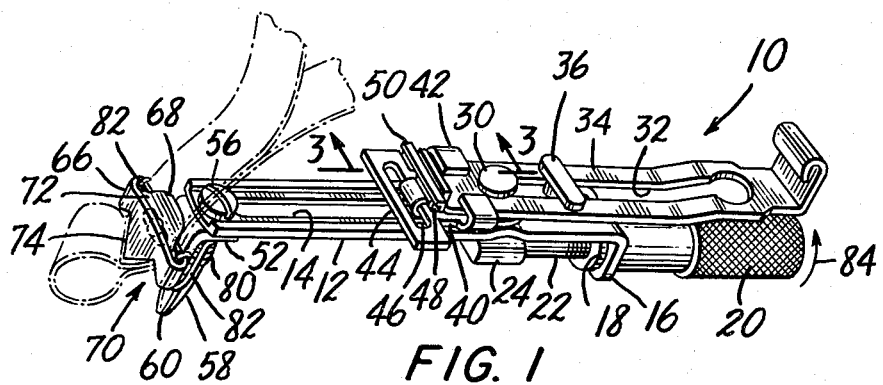
FIG. 1 is an isometric drawing of a dental retainer made in accordance with the instant invention; and showing the top of the retainer.

Referring now to the drawings, the numeral 10 generally denotes a retainer which is comprised of a base 12 having an elongated slot 14. The rear portion of the retainer is bent downwardly to provide a depending flange 16. An opening 18 is provided in flange 16 and a knurled internally threaded barrel 20 is rotably mounted in the opening. A threaded screw 22 having threads complimentary to the internal threads in barrel 20 is mounted in knurled nut 20. Screw 22 is positioned under the elongated slot 14 and has a flattened land 24 at the end thereof. Land 24 is provided with an opening 26 in which a threaded bolt 28 is mounted. Bolt 28 is provided with a head 30 on the upper end thereof which head is wider than the slot 14 to prevent the bolt from slipping out of the slot.

Bolt 28 extends through another elongated slot 32 contained in a slide member 34. An upstanding T-shaped rivet 36 is fixedly mounted to the rear of the rear of the retainer and also extends through the slot 32 in slide member 34. If desired, the flattened upper portion of the T-shaped rivet can be made as a separate part screwed onto the shaft of the rivet.

An additional sliding member 40 is mounted between slide 34 and base 12. Sliding member 40 is provided with a hole adapted to receive the shaft of bolt 28, thereby fixing the position of slidable member 40 with respect to bolt 28. Slidable member 40 is in addition provided with upturned guides 42 adapted to slidably engage the slide member 34. Slidable member 40 in the position shown in FIG. 1 extends somewhat beyond the slide member 34 for reasons described hereinafter.

Slidable member 40 contains a head portion 44 having an elongated opening 46 therein. Spaced somewhat from elongated opening 46 is another opening 48 in which a flap 50 is mounted. Flap 50 is adapted to cover elongated opening 46 and yet be pivoted upwardly away from the opening to allow the insertion of the dental matrix band therein as described.

L-shaped bracket 52 is mounted on the underside of the front portion of base 12. Bracket 52 has an opening 54 therein to accept a bolt 56. Bolt 56 is freely mounted in opening 54 so that the bracket 52 may pivot with respect to the base 12.

The lower portion of bolt 56 is threaded (not shown) to accept a wedge 58 having complementary internal threads. The wedge is provided with a slit 60 at the bottom thereof to give the wedge a degree of resiliency not otherwise achievable with a solid end.

The depending leg of bracket 52 is provided with a screw-in extension or bolt 62 thereon (FIGS. 5 and 6) which is adapted to fit within a slotted opening 64 contained in head 66. The extension 62 ends in a section somewhat wider than the opening 64 to prevent the head 66 from removing itself from the leg of the bracket. This is shown most clearly in FIGS. 5 and 6.

Head 66 has an upper portion 68 which curves rearwardly. The curved portion terminates in a V-shaped section generally indicated by the numeral 70. The section 70 has an elongated slot 72 through which the matrix band can be inserted. The section 70 further has a depending V-shaped front 74 and is sealed at ends 76 and 78 respectively.

Figures 3, 4, 5:
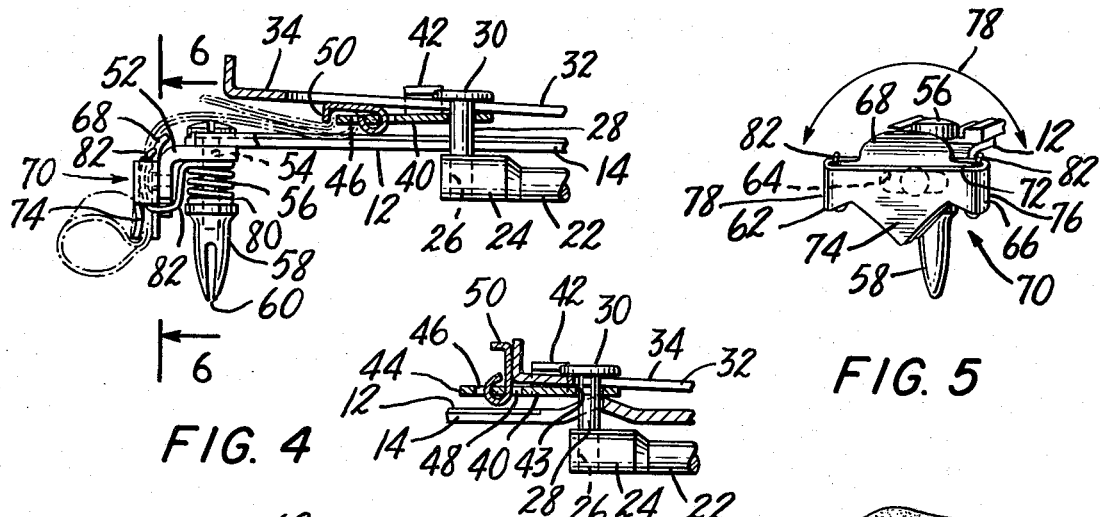
FIG. 3 is a partial view in detail of the top slide taken along line 3—3 in FIG. 1.
FIG. 4 is a sectional side view of the head and wedge portion of the retainer shown in FIG. 1.
FIG. 5 is an isometric view of the head shown in FIG. 1.

As constituted, the head 66 is free to twist in the direction of the arrow 78 in FIG. 5. This is due to the mounting of the head to the L-shaped member 52 through slot 64.

Figure 2:
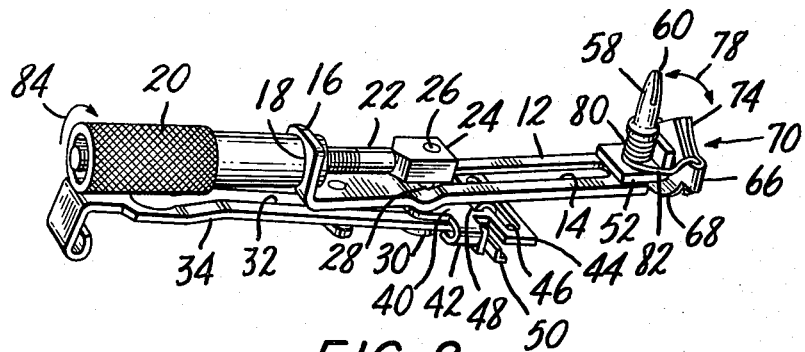
FIG. 2 is an isometric drawing of the dental retainer of FIG. 1 and showing the bottom thereof.

As can be readily appreciated from the drawings, the L-shaped bracket is pivotable on bolt 56 in the direction of arrow 79 (FIG. 2). Since head 66 is mounted to the L-shaped bracket 52, it is also pivotable with respect to the base to the same degree as is the L-shaped bracket. The additional rotating motion of the head 66 with respect to the L-shaped bracket 52 provides an even greater freedom in positioning the bracket for proper action in the mouth of the patient.

Figure 7:
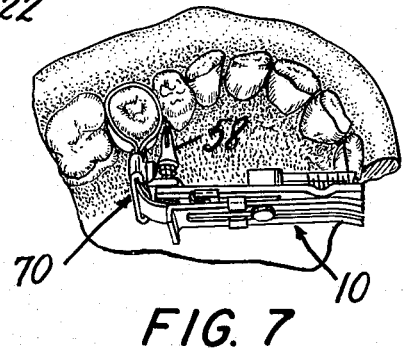
FIG. 7 shows a matrix band positioned about the tooth of a patient.

As an illustration of the above, the matrix band shown in FIG. 7 is first inserted into the elongated slot 72 through the V-shaped opening at the bottom of the head 66. The knurled nut 20 mounted on the base is turned to move the screw 22 as far forward as possible. Slide 40, being attached to bolt 28, is also moved forward with the movement of screw 22. The forward movement of screw 22 terminates when flat land 24 contacts the back of bracket 52. In this position, slidable member 40 is positioned so that the elongated opening 46 is positioned approximately above the top of the opening 72 in head 66. To achieve this, the slot 32 in slide 34 is made just long enough so that bolts 28 and 36 will occupy opposite ends of the slot when screw 22 is in its forwardmost position. This assures that slide 34 will not be covering the opening 40 in the forwardmost position of screw 22.

Elongated opening 46 in slidable numbered 40 is made approximately equal to the length of elongated opening 72 in head 66. The two ends of the matrix band which have been placed together at and inserted through opening 72 are then inserted through opening 46. In the position shown in FIG. 1 slide 34 will clear opening 46 and permit the ends of the matrix band to be moved through the opening.

After the matrix band has been inserted into opening 46, flap 44 is moved downwardly to close the opening and force the free ends of the matrix band to point towards the front of the base, i.e., towards head 66. The matrix band is then placed around the tooth and one of the sides 76 or 78 of head 66, depending on which tooth the band is to be mounted on, is placed adjacent the occlusal portion of the tooth.

The wedge 58 is pointed directly at the gingiva. In order to accommodate this orientation, head 66 will rotate somewhat with respect to the L-shaped bracket. Depending on the location of the tooth, the L-shaped bracket 52 may also pivot somewhat with respect to the base 12 to maintain the side of the head adjacent the occlusal and the V portion pointing at the gingiva.

At this point, knurled nut 20 is turned to cause screw 22 to retreat. Slidable member 40, being attached to bolt 28, will also move rearwardly. Slide member 34 will remain in position since there will be no force urging it to move rearwardly. As slidable member 40 is moved rearwardly, it will be pulled under slide member 34 which will then apply the necessary force to flap 44 to anchor the loose ends of the matrix band in place in the retainer. Continued rearward movement of the slide 40 will also pull the matrix band tight about the tooth.

Since the matrix band is somewhat smaller in extent than the size of the opening 72 in bracket 66, it will be canted somewhat in the opening 72. With one of the sides of the head facing the occlusal and the V section 74 of the bracket along with wedge 58 pointed at the gingiva of the tooth, retraction of slideable member 40 will tighten the band more about the gingiva of the tooth than about the occlusal portion of the tooth. The matrix band, being somewhat canted in the opening 72, will normally rest against one side of the other of the V-shaped section. As can be readily appreciated in FIG. 6, the matrix will have a smaller diameter in the area of the gingiva and a larger diameter in the area of the occlusal even though the matrix itself was originally flat. As can be readily appreciated, the relative movement of the V-shaped head 66 and L-shaped bracket 52 with respect to the base 12 allows a flat matrix to be transformed into a conical shape about the tooth of a patient.

The wedge 58 adds additional capability to the retainer. In use, the wedge is preferably moved to a position adjacent the separation between two teeth. The wedge may then be pushed against the two teeth to move them slightly apart to allow the insertion of the matrix band. In addition, the wedge 58 can be used to retain a rubber dam in place, or to anchor absorbent cotton in place in the mouth of the patient.

As shown in FIGS. 2 and 4, a coil spring 80 is mounted between wedge 58 and the bottom of L-shaped bracket 52. Coil spring 80 has two extending arms 82 which are mounted to slides 76 and 78 of head 66 respectively. Coil spring 80 urges head 66 to a center position to make it easier to insert the matrix band in opening 72 and in opening 46 in slidable member 40. Coil spring 80 tends to keep head 66 in a neutral centered position.

The limit of rotation of head 66 is established by the ends of coil spring 80 which contact each side of head 66. For best results, the ends of coil spring 80 are spot welded to the head to prevent their accidental removal. The ends 82 of the coil spring holds the slot 64 in the head substantially parallel to the slot 46 in slide 44, thereby aligning these two slots for ease in threading the matrix band through both simultaneously.

When the knurled nut 20 is rotated, the matrix band will automatically shift on the curved surface 68 to one or the other side of the head 66. The side of the head to which the matrix band moves will be always positioned at the occlusal position of the tooth and the V section 74 will always and automatically be pointed at the gingiva. This creates the desired ideal constriction of the matrix band at the neck of the tooth (by being bent on one of the sides of V-section 74) and sufficient increased diameter at the occlusal so that anatomical contact is established interproximally.

Figure 6:
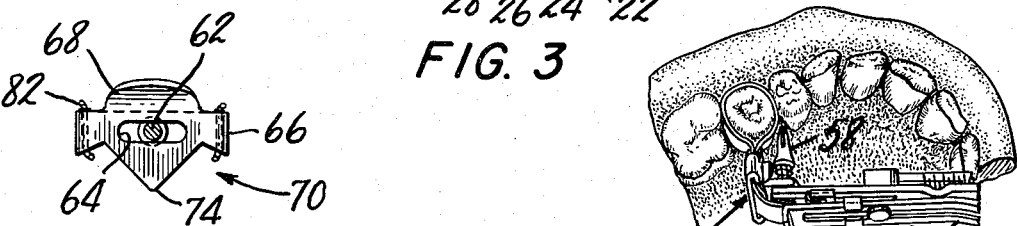
FIG. 6 is a rear view of the head taken along line 6—6 of FIG. 4.

It is to be understood that the invention described herein can be modified by eliminating the pivotable bracket 52 and simply mounting head 66 to the base 12. As long as head 66 is made somewhat pivotable in the direction of the arrow shown in FIG. 1, the retainer described herein will work to cause the matrix band to assume a conical shape as shown in FIG. 6. By the same token, wedge 58 and coil spring 80 may be eliminated without fully destroying the utility of the invention. Nonetheless, for best results, it is preferable that a wide range of movement be permitted head 66 and that wedge 58 and coil spring 80 be present to help anchor the retainer against the teeth; to ease the job of the dentist in spreading adjacent teeth; to retain rubber dams in place; and to retain absorbent cotton in place.

It is understood that modifications to the above described embodiments can be made by those skilled in the art. It is intended to cover all such modifications which do not represent departures from the spirit and scope of the invention as defined in the claims appended hereto.

What is claimed is:

1. In a dental matrix band retainer comprising an elongated base and a head mounted on one end thereof, said head having an elongated opening therein substantially perpendicular to said base for receiving the matrix band, said opening being closed at two opposed ends, said head having a V-shaped extension depending therefrom for engaging the matrix band, said matrix band retainer further comprising a wedge mounted on and depending from said base, a slot in said head facing said base, and means on said base extending through said slot for slidably mounting said head to said base, wherein said means comprises a bracket pivotally mounted on said base, and an extension fixedly mounted to said bracket and extending through said slot for slidably mounting said head to said bracket, said wedge fixedly mounted on said pivotable bracket and spaced from said head for wedging adjacent teeth apart, whereby said wedge is pivotable with respect to said base.

* * * * *